United States Patent
Park et al.

(10) Patent No.: US 9,991,539 B2
(45) Date of Patent: Jun. 5, 2018

(54) POLYMER ELECTROLYTE MEMBRANE, MEMBRANE ELECTRODE ASSEMBLY COMPRISING POLYMER ELECTROLYTE MEMBRANE AND FUEL CELL COMPRISING MEMBRANE ELECTRODE ASSEMBLY

(71) Applicant: LG CHEM, LTD., Seoul (KR)

(72) Inventors: Young Sun Park, Daejeon (KR); Minkyu Min, Daejeon (KR); Hyuk Kim, Daejeon (KR); Seong Ho Choi, Daejeon (KR); Sangwoo Lee, Daejeon (KR); Doyoung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 336 days.

(21) Appl. No.: 14/782,184

(22) PCT Filed: Apr. 29, 2014

(86) PCT No.: PCT/KR2014/003803
§ 371 (c)(1),
(2) Date: Oct. 2, 2015

(87) PCT Pub. No.: WO2014/178619
PCT Pub. Date: Nov. 6, 2014

(65) Prior Publication Data
US 2016/0064764 A1    Mar. 3, 2016

(30) Foreign Application Priority Data

Apr. 29, 2013 (KR) .................. 10-2013-0047773
May 2, 2013 (KR) .................. 10-2013-0049424
Nov. 1, 2013 (KR) .................. 10-2013-0132160
Nov. 26, 2013 (KR) .................. 10-2013-0144440

(51) Int. Cl.
*H01M 8/10* (2016.01)
*H01M 8/1025* (2016.01)
(Continued)

(52) U.S. Cl.
CPC ....... *H01M 8/1025* (2013.01); *H01M 8/1004* (2013.01); *H01M 8/1018* (2013.01); *H01M 8/1044* (2013.01); *H01M 8/1053* (2013.01); *H01M 8/1058* (2013.01); *H01M 8/1062* (2013.01); *H01M 8/1065* (2013.01);
(Continued)

(58) Field of Classification Search
None
See application file for complete search history.

(56) References Cited

U.S. PATENT DOCUMENTS 5,438,082 A    8/1995   Helmer-Metzmann et al.
5,547,551 A    8/1996   Bahar et al.
(Continued)

FOREIGN PATENT DOCUMENTS

CN    1178482       4/1998
EP    1477515 A1    11/2004
(Continued)

*Primary Examiner* — Scott J Chmielecki
(74) *Attorney, Agent, or Firm* — Dentons US LLP (57) ABSTRACT

The present specification provides a polymer electrolyte membrane, a membrane electrode assembly including the polymer electrolyte membrane, and a fuel cell including the membrane electrode assembly.

26 Claims, 6 Drawing Sheets

(51) Int. Cl.
- *H01M 8/1004* (2016.01)
- *H01M 8/1018* (2016.01)
- *H01M 8/1062* (2016.01)
- *H01M 8/1065* (2016.01)
- *H01M 8/1044* (2016.01)
- *H01M 8/1053* (2016.01)
- *H01M 8/1058* (2016.01)
- *H01M 8/1067* (2016.01)
- *H01M 8/1027* (2016.01)
- *H01M 8/1032* (2016.01)
- *H01M 8/1039* (2016.01)
- *H01M 8/103* (2016.01)
- *H01M 8/106* (2016.01)

(52) U.S. Cl.
CPC .......... *H01M 8/1067* (2013.01); *H01M 8/103* (2013.01); *H01M 8/106* (2013.01); *H01M 8/1027* (2013.01); *H01M 8/1032* (2013.01); *H01M 8/1039* (2013.01); *H01M 2008/1095* (2013.01); *H01M 2250/20* (2013.01); *H01M 2300/0082* (2013.01); *H01M 2300/0094* (2013.01); *Y02E 60/521* (2013.01); *Y02T 90/32* (2013.01)

(56) References Cited

U.S. PATENT DOCUMENTS

| | | | |
|---|---|---|---|
| 5,599,614 A | 2/1997 | Bahar et al. | |
| 6,245,881 B1 | 6/2001 | Faure et al. | |
| RE37,701 E | 5/2002 | Bahar et al. | |
| 8,895,175 B2* | 11/2014 | Ouchi | H01M 2/1646 429/129 |
| 8,940,435 B2* | 1/2015 | Kim | H01M 2/10 429/208 |
| 9,246,149 B2* | 1/2016 | Manthiram | H01M 2/1646 |
| 2005/0042489 A1* | 2/2005 | Fukuta | H01M 4/925 429/483 |
| 2007/0231556 A1 | 10/2007 | Park et al. | |
| 2007/0231653 A1 | 10/2007 | Kim et al. | |
| 2009/0291345 A1 | 11/2009 | Hommura et al. | |
| 2011/0008708 A1 | 1/2011 | Akita et al. | |
| 2011/0159404 A1* | 6/2011 | Fuller | H01M 8/1039 429/492 |
| 2011/0287335 A1 | 11/2011 | Akita et al. | |
| 2011/0305970 A1* | 12/2011 | Sahai | H01G 11/38 429/492 |
| 2011/0318669 A1* | 12/2011 | Miyake | C08J 5/2237 429/482 |
| 2012/0076990 A1 | 3/2012 | Merlo et al. | |
| 2012/0122011 A1* | 5/2012 | Zou | H01M 2/1653 429/479 |
| 2012/0178834 A1 | 7/2012 | Linder et al. | |
| 2013/0045436 A1 | 2/2013 | Choi et al. | |
| 2013/0177834 A1* | 7/2013 | Lee | C08J 5/2275 429/494 |
| 2014/0154594 A1* | 6/2014 | Lee | H01M 8/1053 429/408 |
| 2014/0349213 A1* | 11/2014 | Pintauro | H01M 8/1044 429/492 |
| 2015/0064602 A1* | 3/2015 | Lee | H01M 8/1053 429/483 |
| 2015/0214563 A1 | 7/2015 | Kim et al. | |

FOREIGN PATENT DOCUMENTS

| | | |
|---|---|---|
| JP | 6-93114 A | 4/1994 |
| JP | 1999-501964 A | 2/1999 |
| JP | 2005-050561 A | 2/2005 |
| JP | 2005068396 A | 3/2005 |
| JP | 2008-300317 A | 12/2008 |
| KR | 10-0746339 B1 | 7/2007 |
| KR | 10-2007-0098323 A | 10/2007 |
| KR | 10-2012-0128905 A | 11/2012 |
| KR | 2012-0128905 A | 5/2014 |
| WO | WO 1996-028242 A1 | 9/1996 |
| WO | WO 2010-044436 A1 | 4/2010 |

* cited by examiner

POLYMER ELECTROLYTE MEMBRANE, MEMBRANE ELECTRODE ASSEMBLY COMPRISING POLYMER ELECTROLYTE MEMBRANE AND FUEL CELL COMPRISING MEMBRANE ELECTRODE ASSEMBLY

TECHNICAL FIELD

This application is a National Stage Entry of International Application No. PCT/KR2014/003803, filed Apr. 29, 2014, and claims the benefit of and priority to Korean Application No. 10-2013-0047773, filed Apr. 29, 2013, Korean Application No. 10-2013-0049424, filed May 2, 2013, Korean Application No. 10-2013-0132160, filed Nov. 1, 2013, and Korean Application No. 10-2013-0144440, filed Nov. 26, 2013, all of which are incorporated by reference in their entirety for all purposes as if fully set forth herein.

The present specification provides a polymer electrolyte membrane, a membrane electrode assembly including the polymer electrolyte membrane, and a fuel cell including the membrane electrode assembly.

BACKGROUND ART

A fuel cell is a high efficiency power generating device, and has advantages in that the amount of fuel use is low due to high efficiency compared to existing internal combustion engines, and it is a pollution-free energy source that does not produce environmental pollutants such as SOx, NOx, VOC and the like. In addition, there are additional advantages in that a locational area required for production facilities is small, and a construction period is short.

Accordingly, a fuel cell has a variety of applications covering a mobile power supply such as portable devices, a transport power supply such as vehicles, and dispersion power generation usable for domestic use and electric power industries. Particularly, when an operation of a fuel cell vehicle, a next generation transportation device, is commercialized, the potential market size is expected to be extensive.

A fuel cell is largely divided into 5 types depending on the operating temperature and the electrolyte, which specifically includes an alkali fuel cell (AFC), a phosphoric acid fuel cell (PAFC), a molten carbonate fuel cell (MCFC), a solid oxide fuel cell (SOFC), a polymer electrolyte membrane fuel cell (PEMFC) and a direct methanol fuel cell (DMFC). Among these, a polymer electrolyte membrane fuel cell and a direct methanol fuel cell having excellent mobility have received wide attention as a future power supply.

A polymer electrolyte membrane fuel cell has a basic principle such that gas diffusing electrode layers are disposed on both surfaces of a polymer electrolyte membrane, and water is produced by a chemical reaction through the polymer electrolyte membrane by facing an anode toward a fuel electrode and a cathode toward an oxidation electrode, and the reaction energy produced therefrom is converted to electric energy.

A typical example of an ion-conducting polymer electrolyte membrane may include Nafion, a perfluorinated hydrogen ion exchange membrane developed by Dupont USA in early 1960s. Similar commercialized perfluorinated polymer electrolyte membranes other than Nafion include Aciplex-S membrane manufactured by Asahi Kasei Chemicals Corporation, Dow membrane manufactured by Dow Chemical Company, Flemion membrane manufactured by Asahi Glass Co., Ltd., and the like.

Existing commercialized perfluorinated polymer electrolyte membrane has chemical resistance, oxidation resistance, and excellent ion conductance, but has a problem of being expensive and causing environmental problems due to the toxicity of intermediates produced during manufacture. Accordingly, polymer electrolyte membranes in which a carboxyl group, a sulfonic acid group or the like is introduced to an aromatic ring polymer have been studied in order to compensate for the weaknesses of such perfluorinated polymer electrolyte membranes. Examples thereof include sulfonated polyarylether sulfone [Journal of Membrane Science, 1993, 83, 211], sulfonated polyetherether ketone [Japanese Patent Application Laid-Open Publication No. H06-93114, U.S. Pat. No. 5,438,082], sulfonated polyimide [U.S. Pat. No. 6,245,881] and the like.

A polymer electrolyte membrane accompanies changes in membrane thicknesses and volumes of 15 to 30% depending on the temperature and the degree of hydration, and accordingly, the electrolyte membrane is repeatedly expanded and contracted depending on the operation condition of a fuel cell, and microholes or cracks occur due to such volume changes. In addition, as a side reaction, hydrogen peroxide ($H_2O_2$) or peroxide radicals are generated from a reduction reaction of oxygen in a cathode, which may cause the degradation of the electrolyte membrane. A polymer electrolyte membrane for a fuel cell has been developed in the direction of improving mechanical and chemical durability keeping such a phenomenon that may occur during the fuel cell driving in mind.

Studies that have been carried out for improving mechanical durability include a reinforcing composite electrolyte membrane prepared by introducing a Nafion solution (5% by weight concentration) to an e-PTFE (U.S. Pat. No. 5,547,551), and a polymer blend composite membrane introducing a polymer having excellent dimensional stability to a sulfonated hydrocarbon-based polymer material (Korean Patent No. 10-0746339), and the like. In addition, W. L. Gore & Associates introduces a reinforcing composite electrolyte membrane product commercialized as a trade name of Gore Select.

In a reinforcing composite electrolyte membrane, a porous support is used in order to provide mechanical properties and dimensional stability. A porous support needs to maintain mechanical durability while not declining the performances, therefore, a support made of suitable materials provided with high porosity and excellent mechanical properties needs to be selected. In addition, ion conductivity of a membrane greatly varies depending on the method of immersing an ion conductor into a support and the type of the ion conductor, therefore, development of an effective method of immersing an ion conductor, and an ion conductor suitable for a reinforcing composite electrolyte membrane has been required.

DISCLOSURE

Technical Problem

An object of the present specification is to provide a polymer electrolyte membrane, and moreover, to provide a membrane electrode assembly including the polymer electrolyte membrane, and a fuel cell including the membrane electrode assembly.

Technical Solution

One embodiment of the present specification provides a polymer electrolyte membrane including a mixed layer that includes an ion migration region and a support having a 3-dimensional network structure, wherein the ion migration region has a structure in which two or more cells including an ion-conducting material border 3 dimensionally, and the ion migration region includes the ion-conducting material in greater than or equal to 60% by volume and less than or equal to 100% by volume.

One embodiment of the present specification provides a polymer electrolyte membrane including a mixed layer that includes an ion migration region and a support having a 3-dimensional network structure, wherein the ion migration region has a structure in which two or more cells including an ion-conducting material border 3 dimensionally, and a volume ratio of the ion-conducting material with respect to a volume of space in the support is greater than or equal to 0.6 and less than or equal to 1 when 1) separating the ion-conducting material from the support by stirring the polymer electrolyte membrane 3 times for 3 hours each at 80° C. in a solvent capable of dissolving the ion-conducting material, 2) casting the solution including the ion-conducting material separated from the support on a substrate, removing the solvent by drying the result for 24 hours at 100° C., and then measuring the volume of the ion-conducting material, and 3) washing the support with methanol, drying the result for 24 hours at 100° C., and then measuring the volume of space in the support.

One embodiment of the present specification provides a polymer electrolyte membrane including a mixed layer that includes an ion migration region and a support having a 3-dimensional network structure, wherein the ion migration region has a structure in which two or more cells including an ion-conducting material border 3 dimensionally, and the polymer electrolyte membrane further including a pure layer that includes only the ion-conducting material on an upper surface, a lower surface, or an upper surface and a lower surface of the mixed layer, wherein a volume ratio of the ion-conducting material included in the mixed layer with respect to a volume of space in the support is greater than or equal to 0.6 and less than or equal to 1 when 1) measuring a mass of the polymer electrolyte membrane and measuring a volume of the pure layer, 2) separating the ion-conducting material from the support by stirring the polymer electrolyte membrane 3 times for 3 hours each at 80° C. in a solvent capable of dissolving the ion-conducting material, 3) casting the solution including the ion-conducting material separated from the support on a substrate, removing the solvent by drying the result for 24 hours at 100° C., and then measuring a mass and density of the ion-conducting material, 4) washing the support with methanol, drying the result for 24 hours at 100° C., and then measuring the volume of space in the support, 5) measuring a mass of the pure layer from the density of the ion-conducting material and the volume of the pure layer, and 6) measuring a mass of the ion-conducting material included in the mixed layer through subtracting the mass of the pure layer from the mass of the ion-conducting material, and calculating a volume of the ion-conducting material included in the mixed layer through the mass of the ion-conducting material included in the mixed layer and the density of the ion-conducting material.

One embodiment of the present specification provides a membrane electrode assembly including the polymer electrolyte membrane.

One embodiment of the present specification provides a fuel cell including the membrane electrode assembly.

Advantageous Effects

A polymer electrolyte membrane according to one embodiment of the present specification has an advantage of having excellent durability. Specifically, using a membrane electrode assembly including the polymer electrolyte membrane according to one embodiment of the present specification in a fuel cell may contribute to performance enhancement of the fuel cell. In other words, a polymer electrolyte membrane according to one embodiment of the present specification minimizes performance decline of a fuel cell in the working environment of the fuel cell in which high temperature humidification and drying are repeated leading to the repetition of contraction and expansion of a polymer electrolyte membrane, and allows the fuel cell to maintain steady performance.

MODE FOR DISCLOSURE

Hereinafter, the present specification will be described in more detail.

In the present specification, a description of one member being placed "on" another member includes not only a case of the one member adjoining the another member but a case of still another member being present between the two members.

In the present specification, a description of a certain part "including" certain constituents means capable of further including other constituents, and does not exclude other constituents unless particularly stated on the contrary.

One embodiment of the present specification provides a polymer electrolyte membrane including a mixed layer that includes an ion migration region and a support having a 3-dimensional network structure, wherein the ion migration region has a structure in which two or more cells including an ion-conducting material border 3 dimensionally, and the ion migration region includes the ion-conducting material in greater than or equal to 60% by volume and less than or equal to 100% by volume.

According to one embodiment of the present specification, the ion migration region may include the ion-conducting material in greater than or equal to 70% by volume and less than or equal to 100% by volume.

The ion migration region in the present specification may mean a region excluding a skeleton formed by the support. In addition, the ion migration region may be a pore region when only the support is present. Moreover, ions may migrate through the ion-conducting material by the ion-conducting material being included in the ion migration region.

According to one embodiment of the present specification, the polymer electrolyte membrane may exhibit excellent ion conductance when the ion-conducting material is included within the above-mentioned range in the ion migration region.

According to one embodiment of the present specification, the ratio of the ion-conducting material with respect to the ion migration region may be obtained from calculating a total volume of the ion-conducting material in the mixed layer by measuring a mass and a volume of the support, and density of the ion-conducting material, and then using a weight of the ion-conducting material obtained by subtracting the weight of the support measured above from a weight of the mixed layer of the prepared polymer electrolyte membrane, and using the density of the ion-conducting material measured above.

One embodiment of the present specification provides a polymer electrolyte membrane including a mixed layer that includes an ion migration region and a support having a 3-dimensional network structure, wherein the ion migration region has a structure in which two or more cells including an ion-conducting material border 3 dimensionally, and a volume ratio of the ion-conducting material with respect to a volume of space in the support is greater than or equal to 0.6 and less than or equal to 1 when 1) separating the ion-conducting material from the support by stirring the polymer electrolyte membrane 3 times for 3 hours each at 80° C. in a solvent capable of dissolving the ion-conducting material, 2) casting the solution including the ion-conducting material separated from the support on a substrate, removing the solvent by drying the result for 24 hours at 100° C., and then measuring the volume of the ion-conducting material, and 3) washing the support with methanol, drying the result for 24 hours at 100° C., and then measuring the volume of space in the support.

One embodiment of the present specification provides a polymer electrolyte membrane including a mixed layer that includes an ion migration region and a support having a 3-dimensional network structure, wherein the ion migration region has a structure in which two or more cells including an ion-conducting material border 3 dimensionally, and the polymer electrolyte membrane further including a pure layer that includes only the ion-conducting material on an upper surface, a lower surface, or an upper surface and a lower surface of the mixed layer, wherein a volume ratio of the ion-conducting material included in the mixed layer with respect to a volume of space in the support is greater than or equal to 0.6 and less than or equal to 1 when 1) measuring a mass of the polymer electrolyte membrane and measuring a volume of the pure layer, 2) separating the ion-conducting material from the support by stirring the polymer electrolyte membrane 3 times for 3 hours each at 80° C. in a solvent capable of dissolving the ion-conducting material, 3) casting the solution including the ion-conducting material separated from the support on a substrate, removing the solvent by drying the result for 24 hours at 100° C., and then measuring a mass and density of the ion-conducting material, 4) washing the support with methanol, drying the result for 24 hours at 100° C., and then measuring the volume of space in the support, 5) measuring a mass of the pure layer from the density of the ion-conducting material and the volume of the pure layer, and 6) measuring a mass of the ion-conducting material included in the mixed layer through subtracting the mass of the pure layer from the mass of the ion-conducting material, and calculating a volume of the ion-conducting material included in the mixed layer through the mass of the ion-conducting material included in the mixed layer and the density of the ion-conducting material.

The solution including the ion-conducting material means a solution including the ion-conducting material and a solvent capable of dissolving the ion-conducting material.

According to one embodiment of the present specification, the volume of space in the support may be measured through a value obtained by measuring density of materials forming the support, calculating a volume of the materials forming the support through measuring the mass of the support, and then subtracting the volume of the materials forming the support from the total volume of the support.

According to one embodiment of the present specification, the solvent capable of dissolving the ion-conducting material may have solubility for the ion-conducting material of greater than or equal to 5 g and less than or equal to 100 g per 100 g of the solvent at 20° C.

According to one embodiment of the present specification, the solvent capable of dissolving the ion-conducting material may be dimethyl sulfoxide (DMSO).

According to one embodiment of the present specification, the ion migration region may be greater than or equal to 40% by volume and less than or equal to 85% by volume with respect to the total volume of the mixed layer.

According to one embodiment of the present specification, the ion migration region may be greater than or equal to 40% by volume and less than or equal to 80% by volume with respect to the total volume of the mixed layer.

According to one embodiment of the present specification, the ion migration region may be greater than or equal to 40% by volume and less than or equal to 70% by volume with respect to the total volume of the mixed layer.

According to one embodiment of the present specification, the ion migration region may be greater than or equal to 40% by volume and less than or equal to 60% by volume with respect to the total volume of the mixed layer.

According to one embodiment of the present specification, the ion migration region may be greater than or equal to 40% by volume and less than or equal to 55% by volume with respect to the total volume of the mixed layer.

According to one embodiment of the present specification, the ion migration region may be greater than or equal to 45% by volume and less than or equal to 65% by volume with respect to the total volume of the mixed layer.

According to one embodiment of the present specification, the ion migration region may be greater than or equal to 45% by volume and less than or equal to 60% by volume with respect to the total volume of the mixed layer.

When the ion migration region of the polymer electrolyte membrane according to the present specification is greater than or equal to 40% by volume and less than or equal to 85% by volume, sufficient ion conductance may be secured while securing durability of the polymer electrolyte membrane. In other words, when the ion migration region is less than 40% by volume, durability of the polymer electrolyte membrane is enhanced, however, there is a disadvantage in that sufficient ion conductance is difficult to be secured. Moreover, when the ion migration region is greater than 85% by volume, ion conductance of the polymer electrolyte membrane increases, however, there is a disadvantage in that durability is difficult to be secured.

One embodiment of the present specification provides a polymer electrolyte membrane in which the thickness ratio of the mixed layer is greater than or equal to 30% and less than or equal to 100% with respect to the total thickness of the polymer electrolyte membrane.

According to one embodiment of the present specification, the thickness ratio of the mixed layer with respect to the total thickness of the polymer electrolyte membrane may be greater than or equal to 50% and less than or equal to 100%.

According to one embodiment of the present specification, the thickness ratio of the mixed layer with respect to the total thickness of the polymer electrolyte membrane may be greater than or equal to 65% and less than or equal to 95%.

When the thickness ratio of the mixed layer with respect to the total thickness of the polymer electrolyte membrane is outside the above-mentioned range and less than 50% with respect to the total thickness of the polymer electrolyte membrane, a durability enhancing effect of the mixed layer by the support may be insignificant. Specifically, when the thickness of the mixed layer is less than 50% with respect to the total thickness of the polymer electrolyte membrane, the polymer electrolyte membrane may have reduced durability due to an influence of the behavior of a pure layer formed with an ion-conducting material.

According to one embodiment of the present specification, the polymer electrolyte membrane may be formed only with the mixed layer. Specifically, according to one embodiment of the present specification, when the polymer electrolyte membrane is formed only with the mixed layer, the thickness ratio of the mixed layer with respect to the total thickness of the polymer electrolyte membrane may be 100%.

According to one embodiment of the present specification, the thickness ratio of the mixed layer with respect to the total thickness of the polymer electrolyte membrane may be greater than or equal to 50% and less than 100%. Specifically, according to one embodiment of the present specification, the polymer electrolyte membrane may further include a pure layer formed with the ion-conducting material on the upper surface and/or the lower surface of the mixed layer.

When the polymer electrolyte membrane is formed only with the mixed layer, joint strength between the polymer electrolyte membrane and an electrode may be reduced, and this may lead to a problem of the electrode and the polymer electrolyte membrane being separated while operating a fuel cell.

One embodiment of the present specification provides a polymer electrolyte membrane in which the mixed layer has a thickness of greater than or equal to 1 μm and less than or equal to 30 μm.

According to one embodiment of the present specification, the thickness of the mixed layer may be greater than or equal to 1 μm and less than or equal to 25 μm.

According to one embodiment of the present specification, the thickness of the mixed layer may be greater than or equal to 1 μm and less than or equal to 15 μm.

According to one embodiment of the present specification, the thickness of the mixed layer may be greater than or equal to 5 μm and less than or equal to 15 μm.

When the thickness of the mixed layer according to the present specification is greater than or equal to 1 μm and less than or equal to 30 μm, high ion conductance and durability may be obtained. In addition, when the thickness of the mixed layer is within the above-mentioned range, durability decline due to a thickness decrease may hardly occur. In other words, when the thickness of the mixed layer is less than 1 μm, there is a disadvantage in that durability is not maintained, and when the thickness is greater than 30 μm, there is a disadvantage in that ion conductance may decrease.

According to one embodiment of the present specification, the polymer electrolyte membrane may further include a pure layer including only the ion-conducting material provided on the upper surface, the lower surface, or the upper surface and the lower surface of the mixed layer.

According to one embodiment of the present specification, the mixed layer may be formed by immersing the support into the ion-conducting material.

Specifically, according to one embodiment of the present specification, when the ion-conducting material is included up to the thickness range of the support, a polymer electrolyte membrane without a pure layer may be formed. In addition, according to one embodiment of the present specification, when the ion-conducting material is included exceeding the thickness range of the support, a polymer electrolyte membrane provided with a pure layer on the upper surface and/or the lower surface of the mixed layer may be prepared.

According to one embodiment of the present specification, an ion-conducting material included in the mixed layer and an ion-conducting material included in the pure layer may be different from each other. Specifically, according to one embodiment of the present specification, after forming the mixed layer, a pure layer may be formed by coating an ion-conducting material that is different from an ion-conducting material included in the mixed layer on the upper surface and/or the lower surface of the mixed layer.

According to one embodiment of the present specification, the pure layers provided on any one surface of the mixed layer may be each independently laminated in two or more layers, and each layer may include a different ion-conducting material.

According to one embodiment of the present specification, the thicknesses of the pure layers provided on any one surface of the mixed layer may be each independently greater than 0 μm and less than or equal to 6 μm.

According to one embodiment of the present specification, the pure layers may be each provided on the upper surface and the lower surface of the mixed layer.

According to one embodiment of the present specification, the thickness difference between the pure layers each provided on the upper surface and the lower surface of the mixed layer may be 50% or less of the thickness of the mixed layer. Specifically, the thickness difference between the pure layers provided on the upper surface and the lower surface of the mixed layer may be 30% or less of the thickness of the mixed layer. According to one embodiment of the present specification, the thickness difference between the pure layers being 0% of the thickness of the mixed layer means that the thicknesses of the pure layers each provided on the upper surface and the lower surface of the mixed layer are the same.

According to one embodiment of the present specification, when the thickness difference between the pure layer provided on the lower surface of the mixed layer and the pure layer provided on the upper surface of the mixed layer is 50% or less of the thickness of the mixed layer, the degree of contraction and expansion of the upper surface and the lower surface of the polymer electrolyte membrane becomes similar even when humidification and drying of the polymer electrolyte membrane are repeated, and the occurrence of cracks may be prevented.

According to one embodiment of the present specification, the thickness ratio of the mixed layer and the whole pure layer may be from 1:0 to 1:4. Specifically, the thickness ratio of the mixed layer and the whole pure layer may be from 1:0 to 1:1.5. More specifically, the thickness ratio of the mixed layer and the whole pure layer may be from 1:0 to 1:1.

The polymer electrolyte membrane according to one embodiment of the present specification is capable of exhibiting high durability under a condition that humidified and dried states are repeated as the thickness ratio of the mixed layer increases with respect to the pure layer.

According to one embodiment of the present specification, the total thickness of the polymer electrolyte membrane may be greater than or equal to 3 μm and less than or equal to 36 μm.

According to one embodiment of the present specification, the ion-conducting material may include a hydrocarbon-based material.

According to one embodiment of the present specification, the hydrocarbon-based material is a polymer having one or more cation exchangers on the side chain, the ratio of the number of carbon atoms and the number of fluorine atoms included in the polymer is greater than or equal to 1:0 and less than 1:1, and the cation exchanger may include one or more types selected from the group consisting of a sulfonic acid group, a carboxylic acid group, a phosphoric acid group, a phosphonic acid group and derivatives thereof.

According to one embodiment of the present specification, the hydrocarbon-based material may not include fluorine on the main chain or side chain.

According to one embodiment of the present specification, the ratio of the number of carbon atoms and the number of fluorine atoms included in the polymer may be greater than or equal to 1:0 and less than or equal to 2:1 in the hydrocarbon-based material.

According to one embodiment of the present specification, the ion-conducting material may include a cation-conducting material and/or an anion-conducting material.

According to one embodiment of the present specification, the ion-conducting material may include a proton conducting material.

According to one embodiment of the present specification, the ion-conducting material may include one, two or more types selected from the group consisting of a sulfonated benzimidazole-based polymer, a sulfonated polyimide-based polymer, a sulfonated polyetherimide-based polymer, a sulfonated polyphenylenesulfide-based polymer, a sulfonated polysulfone-based polymer, a sulfonated polyethersulfone-based polymer, a sulfonated polyetherketone-based polymer, a sulfonated polyether-etherketone-based polymer, a sulfonated polyphenylquinoxaline-based polymer, and a polymer in which a sulfonated partial fluorine-based is introduced.

According to one embodiment of the present specification, the polymer in which a sulfonated partial fluorine-based is introduced may be a polymer in which a sulfone group binds to at least one side chain, and the ratio of the number of carbon atoms and the number of fluorine atoms included in the polymer is greater than 1:0 and less than 1:1.

According to one embodiment of the present specification, the ion-conducting material may have ion conductance of 1 mS/cm or greater at 60° C. or higher.

According to one embodiment of the present specification, the ion-conducting material may have ion exchange capacity (IEC) of 1 meq/g or greater.

According to one embodiment of the present specification, the support may include a hydrocarbon-based material. Specifically, according to one embodiment of the present specification, the support may be a hydrocarbon-based support.

According to one embodiment of the present specification, the support may include a semi-crystalline polymer.

The semi-crystalline polymer of the present specification may have a crystallinity range of 20% to 80%.

According to one embodiment of the present specification, the semi-crystalline polymer may include polyolefin, polyamide, polyester, polyacetal (or polyoxymethylene), polysulfide, polyvinyl alcohol, copolymers thereof and combinations thereof, but is not limited thereto.

According to one embodiment of the present specification, the support may include those derived from polyolefin-based materials.

The polyolefin may include polyethylene (LDPE, LLDPE, HDPE, UHMWPE), polypropylene, polybutene, polymethylpentene, copolymers thereof and blends thereof.

The polyamide may include polyamide 6, polyamide 6/6, nylon 10/10, polyphthalamide (PPA), copolymers thereof and blends thereof, but is not limited thereto.

The polyester may include polyester terephthalate (PET), polybutylene terephthalate (PBT), poly-1-4-cyclohexylenedimethylene terephthalate (PCT), polyethylene naphthalate (PEN) and liquid crystal polymers (LCP), but is not limited thereto.

The polysulfide includes polyphenyl sulfide, polyethylene sulfide, copolymers thereof and blends thereof, but is not limited thereto.

The polyvinyl alcohol includes ethylene-vinyl alcohol, copolymers thereof and blends thereof, but is not limited thereto.

The polymer electrolyte membrane according to one embodiment of the present specification may include cells having uniform sizes.

Specifically, according to one embodiment of the present specification, an average of the maximum diameters of the cells may be greater than or equal to 0.25 μm and less than or equal to 0.4 μm. In addition, according to one embodiment of the present specification, a standard deviation of the maximum diameters of the cells may be greater than or equal to 0.05 μm and less than or equal to 0.2 μm.

Figure 5:
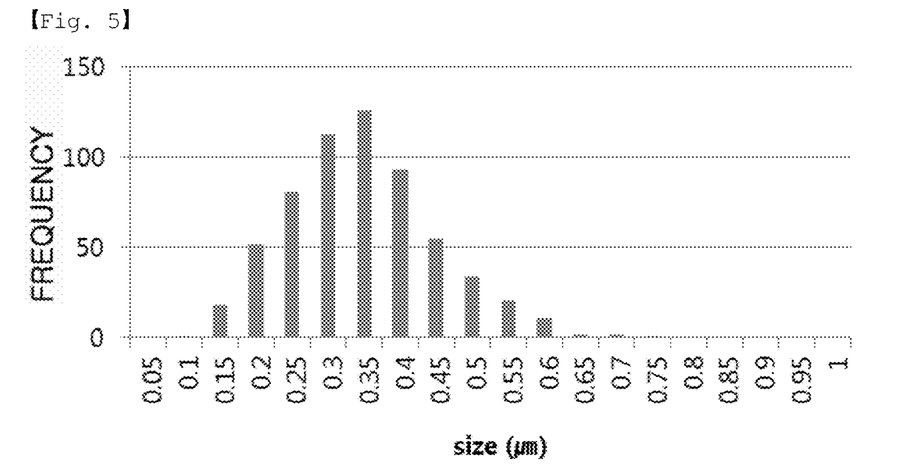
FIG. 5 shows measurement results of maximum diameters of the surface cells of a polymer electrolyte membrane according to one embodiment of the present specification.

FIG. 5 shows measurement results of the maximum diameters of the surface cells of the polymer electrolyte membrane according to one embodiment of the present specification. Specifically, FIG. 5 shows a maximum diameter of each cell located on the surface of the polymer electrolyte membrane according to one embodiment of the present specification, and shows a frequency of the maximum diameter of each cell after measuring the maximum diameters. Accordingly, it can be seen that the polymer electrolyte membrane according to one embodiment of the present specification includes cells having uniform sizes.

According to one embodiment of the present specification, the cells may be laminated in two or more layers in any one direction (x-axis direction), a direction vertical thereto (y-axis direction), and a thickness direction of the polymer electrolyte membrane (z-axis direction) on any surface horizontal to the upper surface of the polymer electrolyte membrane.

According to one embodiment of the present specification, the support may have a sponge structure in which two or more of the cells are distributed.

According to one embodiment of the present specification, sections of two or more of the cells may be included in both the vertical section and the horizontal section of the polymer electrolyte membrane.

The diameter of the cell section of the present specification may mean the length of the longest line crossing the cell section.

According to one embodiment of the present specification, the cell section on the horizontal surface of the polymer electrolyte membrane may have a height to width ratio of 1:1 to 5:1.

According to one embodiment of the present specification, the cell section on the vertical surface of the polymer electrolyte membrane may have a height to width ratio of 1:1 to 10:1.

According to one embodiment of the present specification, the diameter size of the cell section on the horizontal surface of the polymer electrolyte membrane may be greater than or equal to 40 nm and less than or equal to 1,000 nm.

According to one embodiment of the present specification, the diameter size of the cell section on the vertical surface of the polymer electrolyte membrane may be greater than or equal to 40 nm and less than or equal to 1,000 nm.

According to one embodiment of the present specification, the ratio of the cell numbers per 100 $\mu m^2$ of the horizontal surface and the vertical surface of the polymer electrolyte membrane may be from 1:1 to 1:5.

According to one embodiment of the present specification, a variation in the cell numbers on the vertical section and the horizontal section per 100 $\mu m^2$ of the polymer electrolyte membrane may be greater than or equal to 0 and less than or equal to 500.

According to one embodiment of the present specification, an average size of the diameters of the cell sections may be greater than or equal to 40 nm and less than or equal to 500 nm.

According to one embodiment of the present specification, a standard deviation of the diameters of the cell sections may be from 50 nm to 200 nm.

According to one embodiment of the present specification, the cell diameters may be greater than or equal to 40 nm and less than or equal to 1000 nm.

According to one embodiment of the present specification, the support is formed with two or more nodes, and each node may include three or more branches.

According to one embodiment of the present specification, a distance between any one node and another adjacent node of the support may be from 10 nm to 500 nm.

According to one embodiment of the present specification, a length from the center of the cell to any point of the support may be from 20 nm to 500 nm.

According to one embodiment of the present specification, the mixed layer may include greater than or equal to 10 and less than or equal to 400 cells in any region of 1 $\mu m^3$.

According to one embodiment of the present specification, the mixed layer may include greater than or equal to 10 and less than or equal to 150 cells in any region of 1 $\mu m^3$.

According to one embodiment of the present specification, the mixed layer may include greater than or equal to 40 and less than or equal to 150 cells in any region of 1 $\mu m^3$.

Figure 1:
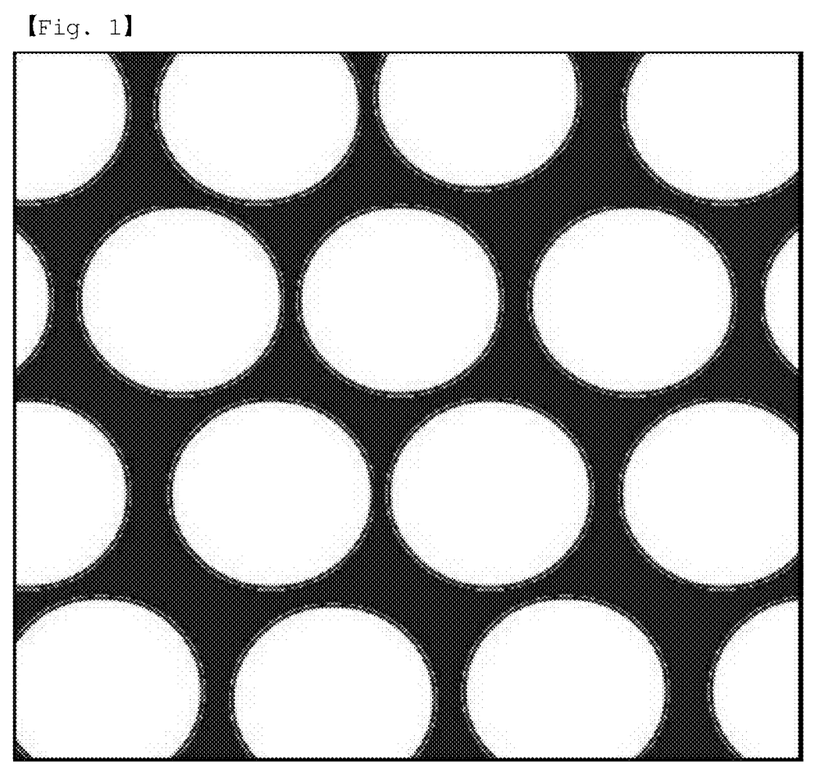
FIGS. 1 and 2 are diagrams showing one region of a surface of a polymer electrolyte membrane according to one embodiment of the present specification.
Figure 2:
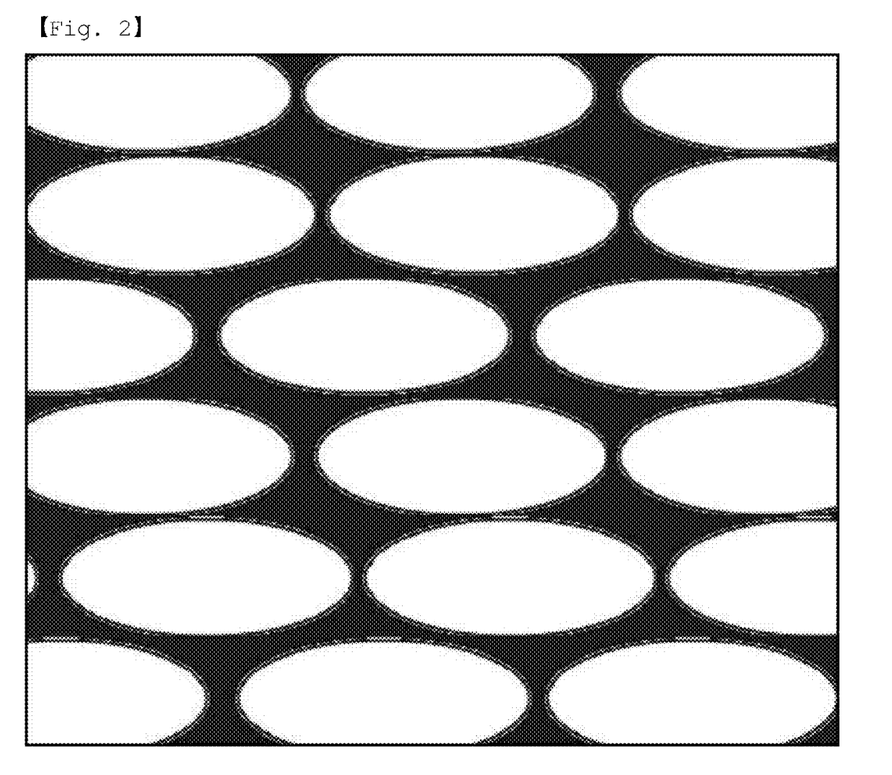

FIGS. 1 and 2 are diagrams showing one region of the surface of a polymer electrolyte membrane according to one embodiment of the present specification. Specifically, FIG. 1 is a diagram showing one region of the horizontal surface of a polymer electrolyte membrane of the present specification, and FIG. 2 is a diagram showing one region of the vertical surface of a polymer electrolyte membrane of the present specification. Furthermore, the region expressed as a dark region means a support, and a light region means an ion migration region.

The vertical surface may mean a surface in the thickness direction of the polymer electrolyte membrane. In addition, the horizontal surface is a surface vertical to the thickness direction of the polymer electrolyte membrane, and may mean a surface occupying a relatively large region.

In FIG. 1 and FIG. 2, the ion migration region may mean a cell section, and cells 3 dimensionally bordering the shown cells are present inside the polymer electrolyte membrane.

The cell of the present specification may have a spherical shape, a shape of pressed sphere, or a polyhedron shape, and when the cell has a spherical shape, the cell section may have a closed figure having a height to width ratio of 1:1 to 5:1.

When nodes and fibrous branches connecting the nodes of the support are connected in the cell of the present specification, it may mean a virtual 3-dimensional closed space surrounded by virtual planes formed. The node may mean a site in which two or more fibrous branches meet. Specifically, the node may mean a site in which two or more fibrous branches meet to form a branching point including 3 or more branches.

Figure 3:
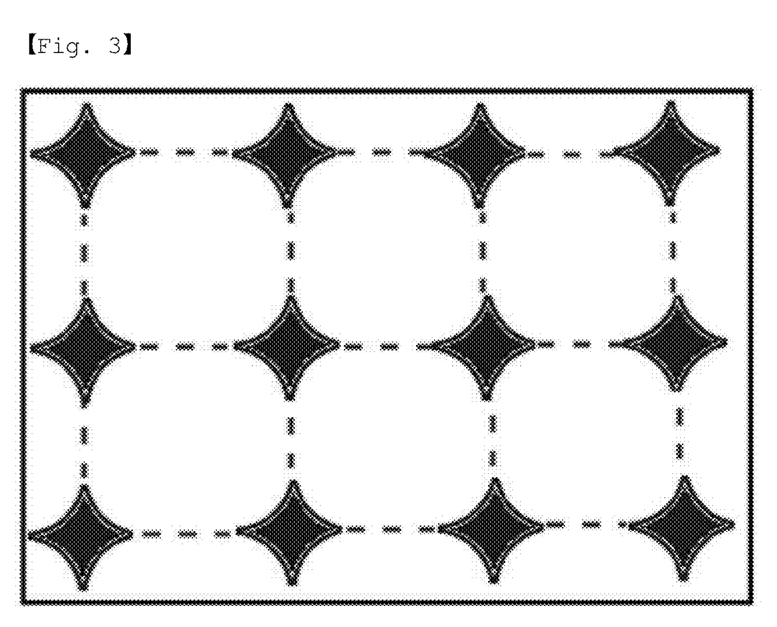
FIG. 3 is a diagram showing one region of a section of a polymer electrolyte membrane according to one embodiment of the present specification.

FIG. 3 is a diagram showing one region of the section of a polymer electrolyte membrane according to one embodiment of the present specification. Specifically, the dotted region in FIG. 3 is a virtual line, and is to divide a virtual 3-dimensional closed space. Those expressed as a dark region are fibrous branches or nodes of a support, and these are connected 3 dimensionally.

In addition, the cell of the present specification is a unit space of an ion migration region including an ion-conducting material surrounded by fibrous branches of the support, and the horizontal and the vertical direction sections of the virtual 3-dimensional closed space in the case of being surrounded by the support fibers may have a figure of a circle, an ellipse or a simple closed curve.

In addition, the cell of the present specification means having a volume of larger than certain sizes, and cells having a diameter of less than 40 nm may not be considered as the cell.

The diameter of the cell in the present specification may mean a length of the longest line crossing the cell.

According to one embodiment of the present specification, the polymer electrolyte membrane may have an RH cycle limit of at least 20,000 cycles.

According to one embodiment of the present specification, the polymer electrolyte membrane may have an RH cycle limit of at least 40,000 cycles.

In addition, according to one embodiment of the present specification, the polymer electrolyte membrane may have an RH cycle limit of at least 50,000 cycles.

Furthermore, according to one embodiment of the present specification, the polymer electrolyte membrane may have an RH cycle limit of at least 60,000 cycles.

In addition, according to one embodiment of the present specification, the polymer electrolyte membrane may have an RH cycle limit of at least 70,000 cycles.

Furthermore, according to one embodiment of the present specification, the polymer electrolyte membrane may have an RH cycle limit of at least 75,000 cycles.

In addition, according to one embodiment of the present specification, the polymer electrolyte membrane may have an RH cycle limit of at least 80,000 cycles.

Furthermore, according to one embodiment of the present specification, the polymer electrolyte membrane may have an RH cycle limit of at least 100,000 cycles.

In addition, according to one embodiment of the present specification, the polymer electrolyte membrane may have an RH cycle limit of at least 120,000 cycles.

Furthermore, according to one embodiment of the present specification, the polymer electrolyte membrane may have an RH cycle limit of at least 150,000 cycles.

According to one embodiment of the present specification, the polymer electrolyte membrane hardly experiences performance decline in the above-mentioned RH cycle range.

According to one embodiment of the present specification, the polymer electrolyte membrane may have an RH cycle limit of 300,000 cycles or less.

According to one embodiment of the present specification, the polymer electrolyte membrane may have an RH cycle limit of 500,000 cycles or less.

The polymer electrolyte membrane according to one embodiment of the present specification has an advantage of having excellent durability. Specifically, excellent durability of the polymer electrolyte membrane may be identified through an RH cycle. More specifically, the polymer electrolyte membrane according to one embodiment of the present specification has an advantage in that durability decline caused by volume changes that occur while conducting an RH cycle similar to a fuel cell driving condition is significantly small.

The RH cycle of the present specification means measuring durability in a fuel cell state after preparing the polymer electrolyte membrane as a membrane electrode assembly (MEA). Specifically, the RH cycle in the present specification means measuring durability under a condition of 80° C. while injecting nitrogen to an anode at a flow rate of 0.95 slm (standard liter per minute), injecting nitrogen to a cathode at a flow rate of 1.0 slm, and switching between humidification of RH (relative humidity) 150% and non-humidification of RH 0% at an interval of two minutes.

Moreover, the RH cycle of the present specification being higher means a polymer electrolyte membrane having higher durability. In addition, the RH cycle limit means the number of cycles up to the cycle at which a polymer electrolyte membrane is damaged enough to be unusable as an MEA from conducting the RH cycle.

In order to measure the RH cycle limit in the present specification, linear sweep volta-mmetry (LSV) is used. Specifically, the LSV means measuring hydrogen crossover at 0.1 to 0.4 V (2 mV/s) while injecting hydrogen to an anode at a flow rate of 0.2 slm, and injecting nitrogen to a cathode at a flow rate of 0.2 slm. In other words, when the hydrogen crossover value increases during the RH cycle, a polymer electrolyte membrane may be considered to be damaged, and depending on the degree of the hydrogen crossover value increase, the degree of the polymer electrolyte membrane damage may be determined. When a hydrogen crossover value rapidly increases during the RH cycle, the polymer electrolyte membrane is damaged enough not to perform its role, and the number of the RH cycles at the time may be the RH cycle limit.

For example, the RH cycle limit means the number of RH cycles during which the hydrogen crossover value of a polymer electrolyte membrane capable of normal operation increases by 5 or more times.

In other words, the RH cycle having a higher limit means a polymer electrolyte membrane having higher durability, and when the RH cycle limit is at least 20,000 cycles, a polymer electrolyte membrane is generally considered to have excellent durability. The polymer electrolyte membrane according to one embodiment of the present specification is capable of maintaining steady performance with almost no performance decline even when the RH cycle limit is 20,000 cycles or greater.

According to one embodiment of the present specification, a maximum stress in the machine direction (MD) of the polymer electrolyte membrane may be 200 kgf/cm$^2$ or greater.

According to one embodiment of the present specification, a maximum stress in the vertical direction of the machine direction (MD) of the polymer electrolyte membrane may be 200 kgf/cm$^2$ or greater.

One embodiment of the present specification provides a polymer electrolyte membrane including a mixed layer that includes an ion migration region and a support having a 3-dimensional network structure, wherein the ion migration region has a structure in which two or more cells including a hydrocarbon-based or partial-hydrocarbon-based ion-conducting material border 3 dimensionally, and a maximum stress in the machine direction (MD) of the polymer electrolyte membrane is 200 kgf/cm$^2$ or greater.

One embodiment of the present specification provides a polymer electrolyte membrane including a mixed layer that includes an ion migration region and a support having a 3-dimensional network structure, wherein the ion migration region has a structure in which two or more cells including a hydrocarbon-based or partial-hydrocarbon-based ion-conducting material border 3 dimensionally, and a maximum stress in the vertical direction of the machine direction (MD) of the polymer electrolyte membrane is 200 kgf/cm$^2$ or greater.

According to one embodiment of the present specification, the polymer electrolyte membrane may have directivity. Specifically, according to one embodiment of the present specification, the support may be prepared through monoaxial orientation or biaxial orientation of a polymer, and the support directivity caused by the orientation may determine the directivity of the polymer electrolyte membrane. Accordingly, the polymer electrolyte membrane according to one embodiment of the present specification may have directivity of the machine direction (MD), and directivity of the vertical direction of the machine direction (MD), and the polymer electrolyte membrane may exhibit differences in physical properties such as stress and elongation depending on the directivity.

The machine direction (MD) may have a meaning generally used in the art. Specifically, the machine direction may mean a winding direction when prepared by being wound in a roll form.

According to one embodiment of the present specification, a maximum stress in the machine direction (MD) of the polymer electrolyte membrane may be 300 kgf/cm$^2$ or greater.

According to one embodiment of the present specification, a maximum stress in the machine direction (MD) of the polymer electrolyte membrane may be 500 kgf/cm$^2$ or greater.

According to one embodiment of the present specification, a maximum stress in the machine direction (MD) of the polymer electrolyte membrane may be 800 kgf/cm$^2$ or greater.

According to one embodiment of the present specification, a maximum stress in the machine direction (MD) of the polymer electrolyte membrane may be 900 kgf/cm$^2$ or greater.

According to one embodiment of the present specification, a maximum stress in the vertical direction of the machine direction (MD) of the polymer electrolyte membrane may be 300 kgf/cm$^2$ or greater.

According to one embodiment of the present specification, a maximum stress in the vertical direction of the machine direction (MD) of the polymer electrolyte membrane may be 400 kgf/cm² or greater.

According to one embodiment of the present specification, a maximum stress in the vertical direction of the machine direction (MD) of the polymer electrolyte membrane may be 600 kgf/cm² or greater.

According to one embodiment of the present specification, a maximum stress in the vertical direction of the machine direction (MD) of the polymer electrolyte membrane may be 800 kgf/cm² or greater.

According to one embodiment of the present specification, a maximum elongation in the machine direction (MD) of the polymer electrolyte membrane may be 20% or greater.

According to one embodiment of the present specification, a maximum elongation in the machine direction (MD) of the polymer electrolyte membrane may be 50% or greater.

According to one embodiment of the present specification, a maximum elongation in the machine direction (MD) of the polymer electrolyte membrane may be 60% or greater.

According to one embodiment of the present specification, a maximum elongation in the vertical direction of the machine direction (MD) of the polymer electrolyte membrane may be 10% or greater.

According to one embodiment of the present specification, a maximum elongation in the vertical direction of the machine direction (MD) of the polymer electrolyte membrane may be 30% or greater.

The maximum stress in the present specification means a magnitude of force per unit area in the instant of a polymer electrolyte membrane cut with a distance between grips of 100 mm and a tension speed of 10 mm/min under a condition of a temperature of 20° C. and humidity of 22%.

In addition, the maximum elongation in the present specification means a percentage of polymer electrolyte membrane stretching in the instant of the polymer electrolyte membrane cut with a distance between grips of 100 mm and a tension speed of 10 mm/min under a condition of a temperature of 20° C. and humidity of 22%. Specifically, the maximum stress and the maximum elongation in the present specification means measuring a polymer electrolyte membrane cut in the form of a dog bone according to the American Society for Testing and Materials (ASTM) standard at a speed of 10 mm/min using a united test machine (UTM). The UTM is an apparatus simultaneously measuring tensile strength and elongation, and is an apparatus generally used in the art.

The polymer electrolyte according to one embodiment of the present specification has a high maximum stress, therefore, has an advantage of performing its function for a long period of time without performance variations in a fuel cell in which an electrolyte membrane is repeatedly expanded and contracted due to the repetition of high temperature humidification and drying.

According to one embodiment of the present specification, the polymer electrolyte membrane may have air permeability of 1 hour/100 ml or greater.

The polymer electrolyte membrane according to one embodiment of the present specification may exhibit excellent efficiency in a fuel cell by forming a dense structure. Specifically, the dense structure of the polymer electrolyte membrane may be shown through the air permeability value. When the polymer electrolyte membrane according to one embodiment of the present specification has air permeability in the above-mentioned range, excellent electrolyte membrane performance may be exhibited in a fuel cell.

The present specification provides a membrane electrode assembly including the polymer electrolyte membrane. In addition, the present specification provides a fuel cell including the membrane electrode assembly.

The fuel cell of the present specification includes fuel cells generally known in the art.

One embodiment of the present specification provides a fuel cell including a stack that includes the membrane electrode assembly and a separator provided between the membrane electrode assemblies; a fuel supply unit supplying fuel to the stack; and an oxidizer supply unit supplying an oxidizer to the stack.

Figure 4:
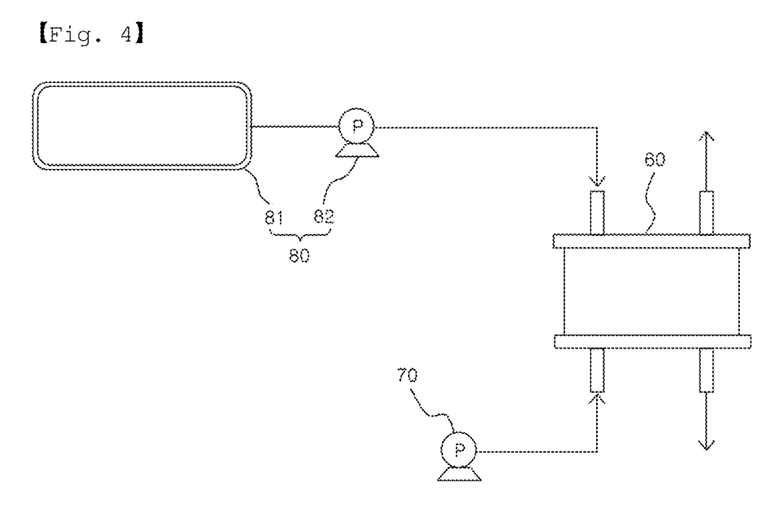
FIG. 4 is a diagram showing a structure of a fuel cell according to one embodiment of the present specification.

FIG. 4 is a diagram showing the structure of a fuel cell according to one embodiment of the present specification, and the fuel cell is formed including a stack (60), an oxidizer supply unit (70) and a fuel supply unit (80).

The stack (200) includes one, two or more of the membrane electrode assemblies, and when two or more of the membrane electrode assemblies are included, a separator provided therebetween is included.

The separator prevents the membrane electrode assemblies from being electrically connected, and performs a role of transferring a fuel and an oxidizer supplied from the outside.

The oxidizer supply unit (70) performs a role of supplying an oxidizer to the stack (60). As the oxidizer, oxygen is typically used, and oxygen or air may be used by being injected with a pump (70).

The fuel supply unit (80) performs a role of supplying a fuel to the stack (60), and may be formed with a fuel tank (81) storing a fuel, and a pump (82) supplying the fuel stored in the fuel tank (81) to the stack (60). As the fuel, a hydrogen or hydrocarbon fuel in a gas or liquid state may be used, and examples of the hydrocarbon fuel may include methanol, ethanol, propanol, butanol or natural gas.

MODE FOR DISCLOSURE

Hereinafter, the present specification will be described in detail with reference to examples. However, examples according to the present specification may be modified to various other forms, and the scope of the present specification is not interpreted to be limited to the examples described below. Examples in the present specification are provided in order to more completely describe the present specification for those having average knowledge in the art.

Example 1

As an ion-conducting material, an immersion solution was made by dissolving a sulfonated polyether-etherketone-based polymer in dimethyl sulfoxide (DMSO) to have a concentration of 5 wt %, and then a support having porosity of approximately 70% and a thickness of approximately 10 μm was immersed into the immersion solution. After that, the result was dried for 24 hours in an oven at 80° C., and a polymer electrolyte membrane was prepared. The prepared polymer electrolyte membrane included the ion-conducting material in the ion migration region in 80.5% by volume. The prepared membrane was acid treated for 24 hours in 10% sulfuric acid at 80° C., washed 4 or more times with distilled water, dried, and then used.

Example 1-1

The polymer electrolyte membrane prepared according to Example 1 was cut into a size of 5 cm×5 cm, and then the weight was measured. After that, the thickness and the volume of the pure layer were measured through a scanning electron microscope (SEM) analysis, and then the ion-conducting material was separated from the support by stirring the polymer electrolyte membrane 3 times for 3 hours each at 80° C. in DMSO.

The support separated from the ion-conducting material was washed with methanol and then dried for 24 hours in an oven at 100° C., and the volume and the mass were measured, and the volume of space in the support was calculated from measuring a volume of the materials forming the support by measuring the density of the materials forming the support and then measuring the mass of the support, and then subtracting the volume of the materials forming the support from the total volume of the support.

In addition, a total mass of the ion-conducting material was calculated from the value obtained by subtracting the weight of the support from the mass of the polymer electrolyte membrane prior to dissolving. The DMSO solution in which the ion-conducting material was dissolved was casted on a glass plate, and DMSO was completely removed by drying the result for 24 hours in an oven at 100° C., and after that, the density of the ion-conducting material was measured. The weight of the pure layer was calculated from the density of the ion-conducting material measured herein, and the mass and the volume of the ion-conducting material in the mixed layer were calculated.

The volume of space in the support calculated as above was 17.5 $mm^2$, and the volume of the ion-conducting material included in the mixed layer was 14.1 $mm^2$. In other words, in the polymer electrolyte membrane according to Example 1-1, the volume ratio of the ion-conducting material included in the mixed layer with respect to the volume of space in the support was 0.8.

Comparative Example 1

A polymer electrolyte membrane was prepared in the same manner as in Example 1 using a support having porosity of approximately 65% and a thickness of approximately 20 μm. However, in the prepared polymer electrolyte membrane, the ion-conducting material was included in the ion migration region in 38.5% by volume through an adjustment during the immersion.

Comparative Example 1-1

In the same manner as in Example 1-1, a volume of space in the support and a volume of the ion-conducting material included in the mixed layer of the polymer electrolyte membrane according to Comparative Example 1 were measured.

The volume of space in the support calculated as above was 32.5 $mm^2$, and the volume of the ion-conducting material included in the mixed layer was 12.5 $mm^2$. In other words, in the polymer electrolyte membrane according to Comparative Example 1-1, the volume ratio of the ion-conducting material included in the mixed layer with respect to the volume of space in the support was 0.38.

Example 2

Performance Evaluation of Membrane Electrode Assembly

In order to measure the performances of the polymer electrolyte membrane prepared according to Example 1 in a fuel cell, a membrane electrode membrane including the polymer electrolyte membrane was prepared. Specifically, the polymer electrolyte membrane was cut into a square of 8 cm×8 cm, and a carbon-deposited platinum catalyst having Pt of 0.4 $mg/cm^2$ was transferred in a size of 5 cm×5 cm to the upper surface and the lower surface of the polymer electrolyte membrane, and a membrane-electrode assembly was prepared. The performance evaluation on the prepared membrane electrode assembly was carried out under a condition of 70° C., relative humidity (RH) of 50%, $H_2$/Air and atmospheric pressure.

Comparative Example 2

A membrane electrode assembly was prepared in the same manner as in Example 2 using the polymer electrolyte membrane prepared according to Comparative Example 1. The performance evaluation on the prepared membrane electrode assembly was carried out under a condition of 70° C., relative humidity (RH) of 50%, $H_2$/Air and atmospheric pressure.

Figure 6:
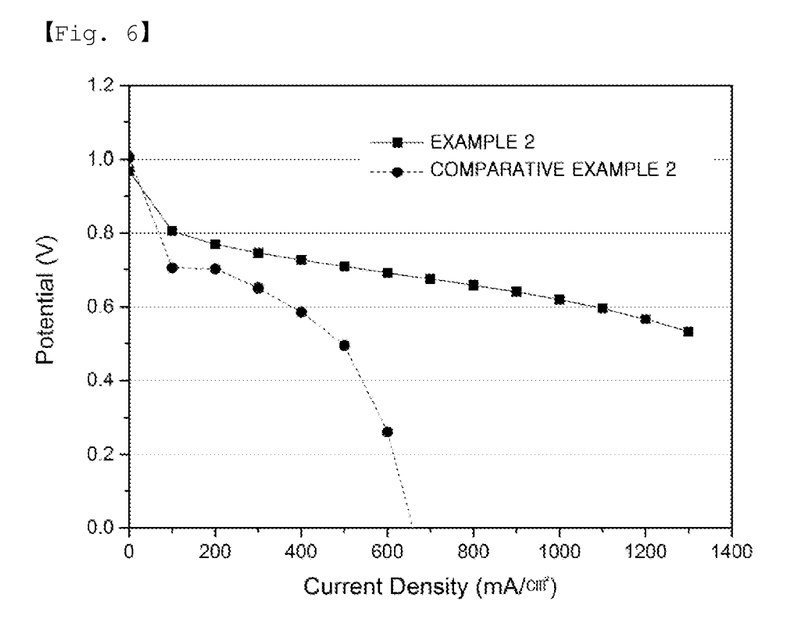
FIG. 6 shows a voltage depending on current density of a membrane electrode assembly prepared according to Example 2 and Comparative Example 2.

FIG. 6 shows a voltage depending on the current density of the membrane electrode assembly prepared according to Example 2 and Comparative Example 2. Specifically, according to FIG. 6, it can be seen that stable performances were exhibited even under low humidity of 50% RH when the ion-conducting material content in the ion migration region was 60% by volume or greater, as in the membrane electrode assembly according to Example 2. This means that, when the ion-conducting material is included in the ion migration region in 60% by volume or greater, the ion-conducting materials in the ion migration region are favorably connected, and an ion transfer channel is widely formed in the support. Meanwhile, when the ion-conducting material content in the ion migration region was 60% by volume or less, as in the membrane electrode assembly according to Comparative Example 2, the degree of the ion-conducting material connection decreases, which causes rapid decline of performances since an ion transfer channel is broken or becomes narrow.

The invention claimed is:

1. A polymer electrolyte membrane comprising a mixed layer that includes an ion migration region and a support having a 3-dimensional network structure,
   wherein the ion migration region has a structure in which two or more cells including an ion-conducting material border 3 dimensionally,
   wherein sections of two or more of the cells are present in both a vertical section and a horizontal section of the polymer electrolyte membrane, and
   the ion migration region includes the ion-conducting material in greater than or equal to 60% by volume and less than or equal to 100% by volume.

2. A polymer electrolyte membrane comprising a mixed layer that includes an ion migration region and a support having a 3-dimensional network structure,
   wherein the ion migration region has a structure in which two or more cells including an ion-conducting material border 3 dimensionally, wherein sections of two or more of the cells are present in both a vertical section and a horizontal section of the polymer electrolyte membrane, and a volume ratio of the ion-conducting material with respect to a volume of space in the support is greater than or equal to 0.6 and less than or equal to 1 when
   1) separating the ion-conducting material from the support by stirring the polymer electrolyte membrane 3 times for 3 hours each at 80° C. in a solvent capable of dissolving the ion-conducting material, 2) casting the solution including the ion-conducting material separated from the support on a substrate, removing the solvent by drying the result for 24 hours at 100° C., and then measuring the volume of the ion-conducting material, and 3) washing the support with methanol, drying the result for 24 hours at 100° C., and then measuring the volume of space in the support.

3. A polymer electrolyte membrane comprising a mixed layer that includes an ion migration region and a support having a 3-dimensional network structure,
wherein the ion migration region has a structure in which two or more cells including an ion-conducting material border 3 dimensionally,
wherein sections of two or more of the cells are present in both a vertical section and a horizontal section of the polymer electrolyte membrane, and
the polymer electrolyte membrane further comprising a pure layer including only the ion-conducting material on an upper surface, a lower surface, or an upper surface and a lower surface of the mixed layer,
wherein a volume ratio of the ion-conducting material included in the mixed layer with respect to a volume of space in the support is greater than or equal to 0.6 and less than or equal to 1 when
1) measuring a mass of the polymer electrolyte membrane and measuring a volume of the pure layer, 2) separating the ion-conducting material from the support by stirring the polymer electrolyte membrane 3 times for 3 hours each at 80° C. in a solvent capable of dissolving the ion-conducting material, 3) casting the solution including the ion-conducting material separated from the support on a substrate, removing the solvent by drying the result for 24 hours at 100° C., and then measuring a mass and density of the ion-conducting material, 4) washing the support with methanol, drying the result for 24 hours at 100° C., and then measuring the volume of space in the support, 5) measuring a mass of the pure layer from the density of the ion-conducting material and the volume of the pure layer, and 6) measuring a mass of the ion-conducting material included in the mixed layer through subtracting the mass of the pure layer from the mass of the ion-conducting material, and calculating a volume of the ion-conducting material included in the mixed layer through the mass of the ion-conducting material included in the mixed layer and the density of the ion-conducting material.

4. The polymer electrolyte membrane of claim 1, wherein the ion migration region is greater than or equal to 40% by volume and less than or equal to 85% by volume with respect to a total volume of the mixed layer.

5. The polymer electrolyte membrane of claim 1, wherein a thickness of the mixed layer is greater than or equal to 1 μm and less than or equal to 30 μm.

6. The polymer electrolyte membrane of claim 1 further comprising a pure layer including only the ion-conducting material provided on an upper surface, a lower surface, or an upper surface and a lower surface of the mixed layer.

7. The polymer electrolyte membrane of claim 6, wherein thicknesses of the pure layers provided on any one surface of the mixed layer are each independently greater than 0 μm and less than or equal to 6 μm.

8. The polymer electrolyte membrane of claim 6, wherein a thickness difference between the pure layers each provided on the upper surface and the lower surface of the mixed layer is 50% or less of a thickness of the mixed layer.

9. The polymer electrolyte membrane of claim 6, wherein a thickness ratio of the mixed layer and the whole pure layer is from 1:0 to 1:4.

10. The polymer electrolyte membrane of claim 6, wherein the pure layers provided on any one surface of the mixed layer are each independently laminated in two or more layers, and each layer includes a different ion-conducting material.

11. The polymer electrolyte membrane of claim 1, which has a total thickness of greater than or equal to 3 μm and less than or equal to 36 μm.

12. The polymer electrolyte membrane of claim 1, wherein the ion-conducting material includes a hydrocarbon-based material.

13. The polymer electrolyte membrane of claim 12, wherein the hydrocarbon-based material is a polymer having one or more cation exchangers on a side chain, a ratio of the number of carbon atoms and the number of fluorine atoms included in the polymer is greater than or equal to 1:0 and less than 1:1, and the cation exchanger includes one or more types selected from the group consisting of a sulfonic acid group, a carboxylic acid group, a phosphoric acid group, a phosphonic acid group and derivatives thereof.

14. The polymer electrolyte membrane of claim 1, which has an RH cycle limit of at least 20,000 cycles.

15. The polymer electrolyte membrane of claim 1, wherein the ion-conducting material includes one, two or more types selected from the group consisting of a sulfonated benzimidazole polymer, a sulfonated polyimide-based polymer, a sulfonated polyetherimide-based polymer, a sulfonated polyphenylenesulfide-based polymer, a sulfonated polysulfone-based polymer, a sulfonated polyethersulfone-based polymer, a sulfonated polyetherketone-based polymer, a sulfonated polyether-etherketone-based polymer, a sulfonated polyphenylquinoxaline-based polymer, and a polymer in which a sulfonated partial fluorine-based is introduced.

16. The polymer electrolyte membrane of claim 1, wherein the support includes a hydrocarbon-based material.

17. The polymer electrolyte membrane of claim 1, wherein the support includes a semi-crystalline polymer.

18. The polymer electrolyte membrane of claim 1, wherein the support includes polyolefin, polyamide, polyester, polyacetal (or polyoxymethylene), polysulfide, polyvinyl alcohol, copolymers thereof and combinations thereof.

19. The polymer electrolyte membrane of claim 1, wherein an average of maximum diameters of the cells is greater than or equal to 0.25 μm and less than or equal to 0.4 μm, and a standard deviation of maximum diameters of the cells is greater than or equal to 0.05 μm and less than or equal to 0.2 μm.

20. The polymer electrolyte membrane of claim 1, wherein the cells are laminated in two or more layers in any one direction (x-axis direction), a direction vertical thereto (y-axis direction), and a thickness direction of the polymer electrolyte membrane (z-axis direction) from any surface horizontal to an upper surface of the polymer electrolyte membrane.

21. The polymer electrolyte membrane of claim 1, wherein the support has a sponge structure in which two or more of the cells are distributed.

22. The polymer electrolyte membrane of claim 1, wherein the support is formed with two or more nodes, and each node includes three or more branches.

23. The polymer electrolyte membrane of claim 1, wherein the mixed layer includes greater than or equal to 10 and less than or equal to 400 cells in any region of 1 μm³.

24. The polymer electrolyte membrane of claim 1, which has air permeability of 1 hour/100 ml or greater.

25. A membrane electrode assembly comprising the polymer electrolyte membrane of claim 1.

26. A fuel cell comprising the membrane electrode assembly of claim 25.

* * * * *